United States Patent Office 2,802,744
Patented Aug. 13, 1957

2,802,744
METHOD OF PRODUCING SYNTHETIC SAUSAGE CASINGS

Richard Weingand, Walsrode, Germany

No Drawing. Application November 23, 1954,
Serial No. 470,794

Claims priority, application Germany December 1, 1953

5 Claims. (Cl. 99—176)

It is general practice to subject synthetic sausage casings of cellulose, albuminous products, parchment paper, and similar starting materials, to a drying process after manufacture, and to market them in the dry state. Since the casings usually become relatively brittle when dried, it is necessary to add an emollient in the form of glycerine to them before drying, while before use they are generally swollen by treatment in water for one quarter to half an hour, whereby the emollient is entirely or partially removed from them.

In the case of the synthetic sausage casings consisting of alginates or alginic acid, which on account of their edibility are particularly suitable for Vienna, frankfurter, and similar small sausages as a substitute for natural sausage casings but are applicable also to sausages being eaten without the casing, circumstances are, surprisingly, substantially different. In the case of these synthetic casings, it is in practice most essential that they should be delivered to the consumer in such a condition that they need not first be soaked before the sausage meat is introduced into them, but that the consumer should be able to use them immediately on the filling machine in the condition in which they are received from the manufacturer.

To this end, synthetic sausage casings of alginic acid or alignates are according to the invention prepared in a suitable manner for marketing and delivery to the consumer. Above all, the invention consists in that so high a moisture content is given these synthetic casings and is maintained in them until they are used, that they need no after-treatment with water before the filling operation.

The most favorable water content of the alginate or alginic-acid sausage casings is of 200% calculated as regards the alginate or alginic acid and, practically, it may be reduced to 100%.

Furthermore care may be taken according to the invention that the sausage casings of alginates or alginic acid contain a relatively high percentage of emollient, for example glycerine, in order that they may not become brittle in the filled state, on the spike supporting them at the suspension point during the smoking of the sausages, particularly when very high temperatures are used. The glycerine content of the alginate or alginic acid sausage casing may be, for instance, of 40% calculated with respect to the alginate or the alginic acid. In the case of applying the synthetic casings of alginic acid or alginates for sausages which are not smoked, for example, for sausages for frying, the glycerine content may be considerably reduced or even omitted.

In addition, it is desirable that the alginate or alginic acid sausage casings should contain a stock of calcium ions in order to prevent an exchange of bases with the filling, these calcium ions being incorporated in the casings according to the invention preferably in the form of a readily or difficultly soluble calcium salt which is admissible as regards human consumption. Calcium citrate, calcium lactate, calcium acetate, calcium sulphate, and calcium formiate are in particular suitable for this purpose. The calcium salts can be introduced into the sausage casings by impregnating the latter with a solution consisting for example of calcium chloride and glycerine. The addition of salts containing calcium ions comes into question not only in the case of filling masses containing sodium salt and of calcium alginate sausage casings but also in general in the case of all the fillings containing alkali salts and of other metal alginate sausage casings as for instance aluminium alginate sausage casings and of alginic acid sausage casings.

The difficulty soluble salts being not injurious to the human organism can be produced during the manufacture of the synthetic sausage casing as a precipitate in the latter during the precipitation of the originating alginate solution. If for example it is desired to produce in the casing a precipitate of calcium citrate, the procedure is to add soluble sodium citrate to the alginate solution. On the precipitation of the casing after the shaping with the aid of a calcium chloride bath, the difficultly soluble calcium citrate is then precipitated in the casing.

Normally, an alginate or alginic acid sausage casing prepared according to the invention for direct and immediate usability may have a water content of 150% and contain 60% of calcium chloride calculated with respect to dry alginate or an equivalent amount of another calcium salt and 40% of glycerine. The content of calcium salt determining the stock of calcium ions contained in the alginate or alginic acid sausage casings may be reduced in favorable circumstances from 60% to 15% of calcium chloride or to the equivalent amount of another calcium salt.

Examples

1. A calcium alginate sausage casing produced in tubular form from an aqueous solution of 6% strength of sodium alginate by precipitating by means of a weakly acid calcium chloride solution of 10% strength and by shaping by means of an annular nozzle is passed after washing through a bath which contains 15% of glycerine and 8% of calcium lactate in solution. The tubular synthetic sausage casing is then freed from the excess solution adhering to it by stripping, and after dividing into pieces of a length of 5 or 10 metres is packed in a water vapour proof wrapping, for example in bags of polyethylene, in which it is dispatched and in which it can be kept indefinitely. The tubular pieces can be drawn over the injection nozzle of the filling machine and filled in this condition immediately and directly.

2. 1.5% of tri-sodium phosphate is added to an aqueous solution of 6% strength of sodium alginate and dissolved therein. This solution is spun into a sausage casing by means of an annular nozzle in a bath which consists of a calcium chloride solution of 15% strength, whereby a difficultly soluble precipitate of tri-calcium phosphate is formed in said casing. The resulting tubular sausage casing is passed after washing through an emollient bath having the pH-value 4 and containing 20% of calcium chloride and 15% of glycerine. Then, the sausage casing is freed from the excess water by stripping the adhering water and by shortly drying so that it contains still 150% of water calculated with respect to the dry alginate. In this state, the sausage casing will be delivered to the consumer in a water proof packing in length of 5 to 10 metres.

Having thus described and ascertained the nature of my invention, I declare that what I claim is:

1. The method for producing synthetic tubular sausage casings, made from an alginate solution by coagulation, and maintaining the casings in condition permitting their direct and immediate use on the sausage-filling machine, without previous soaking, which comprises the steps of passing a freshly coagulated and water-washed tubular casing through an aqueous solution of glycerine as a softener so as to retain in the casing walls said softener in an amount from 15 to 40% and a quantity of water amounting at least to 100%, both amounts calculated on the dry alginate present, removing the excess solution adhering to the tubular casing, and thereafter storing said casing in a moisture-proof wrapping until it is applied to the filling machine.

2. The method as set forth in claim 1, of producing synthetic tubular sausage casings, made from an alginate solution by coagulation, and maintaining the casings in condition permitting their direct and immediate use on the sausage-filling machine, without previous soaking, which comprises the steps of passing a freshly coagulated and water-washed tubular casing through an aqueous solution containing glycerine in an amount of 15% and in addition a calcium salt which is compatible with the human body, in an amount chemically equivalent to from 15–60% by weight of calcium chloride calculated on the dry alginate.

3. A synthetic sausage casing made from alginates, having in its wall a moisture content ranging between 100 and 200% and glycerine ranging from 15 to 40%, both contents calculated on the dry alginate present.

4. A synthetic sausage casing as claimed in claim 3, containing in its wall glycerine softener in an amount of 15% and a water-soluble ionizable calcium salt compatible with the human body functioning in use as a source of calcium ions in a proportion chemically equivalent to from 15%–60% by weight of calcium chloride calculated on dry alginate.

5. A synthetic sausage casing as claimed in claim 4, packed in a water-tight wrapping.

References Cited in the file of this patent

UNITED STATES PATENTS

| | | |
|---|---|---|
| 1,348,459 | Swett | Aug. 3, 1920 |
| 2,485,512 | Rose | Oct. 18, 1949 |
| 2,627,466 | Lewis | Feb. 3, 1953 |
| 2,703,287 | Peters | Mar. 1, 1955 |

FOREIGN PATENTS

| | | |
|---|---|---|
| 492,264 | Great Britain | Sept. 13, 1938 |